US011920106B2

(12) United States Patent
Trinchera et al.

(10) Patent No.: US 11,920,106 B2
(45) Date of Patent: Mar. 5, 2024

(54) METHOD FOR PRODUCING MULTIPHASE WASHING OR CLEANING AGENT SHAPED BODIES

(71) Applicant: Henkel AG & Co. KGaA, Duesseldorf (DE)

(72) Inventors: Maria Trinchera, Huerth (DE); Matthias Sunder, Duesseldorf (DE); Katja Gerhards, Duesseldorf (DE); Steffen Ristau, Duesseldorf (DE); Mohamed Aztout, Duesseldorf (DE); Vera Diel, Leverkusen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 196 days.

(21) Appl. No.: 17/347,107

(22) Filed: Jun. 14, 2021

(65) Prior Publication Data

US 2021/0301225 A1 Sep. 30, 2021

Related U.S. Application Data

(63) Continuation of application No. PCT/EP2019/083220, filed on Dec. 2, 2019.

(30) Foreign Application Priority Data

Dec. 13, 2018 (DE) ......................... 102018221584.7

(51) Int. Cl.

| | |
|---|---|
| ***C11D 11/00*** | (2006.01) |
| ***C11D 17/00*** | (2006.01) |
| ***C11D 17/04*** | (2006.01) |

(52) U.S. Cl.

CPC ........ *C11D 11/0082* (2013.01); *C11D 17/042* (2013.01)

(58) Field of Classification Search

None

See application file for complete search history.

(56) References Cited

U.S. PATENT DOCUMENTS

| | | | | |
|---|---|---|---|---|
| 6,750,193 | B1 | 6/2004 | Holderbaum et al. | |
| 2001/0039254 | A1* | 11/2001 | Browne | C11D 13/16 510/447 |
| 2019/0085265 | A1* | 3/2019 | Kurth | C11D 17/042 |
| 2019/0345421 | A1* | 11/2019 | Vockenroth | C11D 3/2065 |
| 2019/0345422 | A1* | 11/2019 | Sunder | C11D 3/38 |

FOREIGN PATENT DOCUMENTS

| | | | |
|---|---|---|---|
| DE | 10134309 | A1 | 2/2003 |
| DE | 102015213943 | A1 * | 1/2017 |
| EP | 1466964 | A1 | 10/2004 |
| EP | 1669438 | A1 | 6/2006 |
| WO | WO 2012/025736 | A2 * | 3/2012 |
| WO | WO 2018/138119 | A1 * | 8/2018 |

OTHER PUBLICATIONS

PCT International Search Report PCT/EP2019/083220 Completed: Apr. 7, 2020; dated Apr. 17, 2020 2 pages.

* cited by examiner

*Primary Examiner* — Lorna M Douyon

(74) *Attorney, Agent, or Firm* — Bojuan Deng

(57) ABSTRACT

A method for producing a multiphase washing or cleaning agent shaped body, including the steps of: a) providing a first free-flowing washing or cleaning agent; b) providing a second washing or cleaning agent; c) feeding the first and second washing or cleaning agent to an injector; d) introducing the first free-flowing washing or cleaning agent and the second free-flowing washing or cleaning agent into a mold by way of the injector; e) solidifying at least one of the free-flowing first and second washing or cleaning agents in the mold, forming a multiphase washing or cleaning agent shaped body; f) removing the multiphase washing or cleaning agent shaped body from the mold, wherein the first and second free-flowing washing or cleaning agent are introduced into the mold through outlet openings in the injector, which are separated. The invention also relates to multiphase shaped bodies produced by way of this method.

18 Claims, No Drawings

METHOD FOR PRODUCING MULTIPHASE WASHING OR CLEANING AGENT SHAPED BODIES

FIELD OF THE INVENTION

The present invention relates to a method for producing a multiphase washing or cleaning agent shaped body, and to the specific washing or cleaning agent shaped bodies produced by means of this method.

BACKGROUND OF THE INVENTION

Washing or cleaning agents are offered to the consumer in the form of solid or liquid products. The solid and liquid washing or cleaning agents were originally packaged in the form of larger containers (e.g. pouches or bottles). These large containers have recently been at least partially replaced by pre-dosed packaging forms ("unit dose"). These dosing units are, for example, tablets or water-soluble pouches. The dosing units can in turn be designed as single-phase or multiphase units.

Multiphase washing or cleaning agent dosing units offer manufacturers and consumers alike a number of advantages over single-phase dosing units. For example, incompatible ingredients can be separated from one another in the separate phases of multiphase dosing units. In addition, the multiphase nature of a dosing unit can be used, for example, to visualize and communicate the different aspects of the washing or cleaning effect thereof.

In addition to forming powdered premixes into tablets so as to form multiphase tablets, the importance of the packaging of liquids or powders in water-soluble multi-chamber pouches is growing. By comparison with multiphase tablets, corresponding products are usually distinguished by a significantly shorter dissolution time. Short dissolution times have in turn an advantageous effect on the washing- or cleaning-active effect of the dosing units.

The dosing units can be packaged in a water-insoluble film or a water-soluble film. While the water-insoluble film has to be removed by the consumer before using the dosing unit, the film which is soluble when added to the aqueous washing or cleaning liquor can remain on the dosing unit. Despite this easier handling, film seams that are not leak-proof and a product feel that may be perceived as unpleasant might prove disadvantageous.

Against this technical background, the problem addressed was that of providing a multiphase dosing unit for washing or cleaning agents which is distinguished by good dissolution behavior, an attractive product appearance and an appealing product feel. The dosing unit should also be easy to store and transport even under high mechanical loads.

BRIEF SUMMARY OF THE INVENTION

This problem was solved in a first embodiment by a specific production method.

A first claimed subject matter is a method for producing a multiphase washing or cleaning agent shaped body, comprising the steps of a) providing a first free-flowing washing or cleaning agent;
b) providing a second washing or cleaning agent;
c) feeding the first and second washing or cleaning agent to an injector;
d) introducing the first free-flowing washing or cleaning agent and the second free-flowing washing or cleaning agent, which is different from the first washing or cleaning agent, into a mold by means of the injector;
e) solidifying at least one of the free-flowing first and second washing or cleaning agents in the mold, thus forming a multiphase washing or cleaning agent shaped body;
f) removing the multiphase washing or cleaning agent shaped body from the mold, wherein the first and second free-flowing washing or cleaning agent are introduced into the mold through outlet openings in the injector which are separated from one another.

A washing agent is a composition which is suitable for cleaning or caring for textiles and contains at least one textile-cleaning or textile-care active substance. Examples of textile-cleaning active substances are

- surfactants, in particular nonionic or anionic surfactants,
- builders, in particular citrates, hydrogen carbonates, carbonates, silicates and water-softening polymers,
- enzymes, in particular proteases, amylases and lipases.

Examples of textile-care active substances are

- fragrances, in particular encapsulated fragrances,
- fabric softeners, in particular cationic surfactants and cationic polymers,
- dyes, in particular textile coloring agents.

A cleaning agent is a composition which is suitable for cleaning and caring for hard surfaces and contains at least one surface-cleaning or surface-care active substance. Examples of surface-cleaning active substances are

- surfactants, in particular nonionic or anionic surfactants,
- builders, in particular citrates, hydrogen carbonates, carbonates, silicates and water-softening polymers,
- enzymes, in particular proteases, amylases and lipases,
- organic acids, in particular formic acid, acetic acid or citric acid.

Examples of surface-care active substances are

- corrosion inhibitors, in particular zinc salts,
- water repellants, in particular polymer water repellants.

A shaped body should be understood to mean a body produced by means of a shaping process. Preferred shaped bodies are dimensionally stable. Bodies are considered dimensionally stable if they have an inherent dimensional stability that enables them to assume a non-disintegrating spatial shape under the usual conditions of manufacture, storage, transport and handling by the consumer, this spatial shape also not changing under the conditions mentioned over an extended period of time, preferably 4 weeks, particularly preferably 8 weeks and in particular 32 weeks, i.e. under the usual conditions of manufacture, storage, transport and handling by the consumer, the body remains in the spatial-geometric shape created during manufacture, i.e. it does not dissolve.

A "phase" is a visually perceptible, coherent spatial region of the shaped body that preferably constitutes at least 5 vol. %, preferably 10 to 90 vol. % and in particular 20 to 80 vol. %, of the shaped body. A two-phase shaped body therefore comprises two visually distinguishable, coherent spatial regions, one region of which covers, for example, 10 vol. % of the shaped body, and the other region of which covers, for example, 90 vol. % thereof.

An injector is a device which is suitable for introducing a free-flowing composition into a mold. The injector is, for example, a filling spout or a nozzle.

DETAILED DESCRIPTION OF THE INVENTION

In the first two steps of the method, a first and a second free-flowing washing or cleaning agent are provided. These agents can be provided continuously or discontinuously, for example in a batch process. In a preferred embodiment, the free-flowing washing or cleaning agents are provided discontinuously in steps a) and b), whereas the first and second washing or cleaning agent are fed to the injector continuously in step c). The discontinuously provided free-flowing washing or cleaning agents can be transferred, for example, in a storage container and thus fed to the process system. Of course, the reactors used for the discontinuous production can also be used as storage containers themselves. The use of storage containers makes it possible to buffer fluctuations in the material flows of the process system.

Another claimed subject matter is a method for producing a multiphase washing or cleaning agent shaped body, comprising the steps of a) providing a first free-flowing washing or cleaning agent in a storage container;
b) providing a second free-flowing washing or cleaning agent in a storage container;
c) feeding the first and second washing or cleaning agent to an injector;
d) introducing the first free-flowing washing or cleaning agent and the second free-flowing washing or cleaning agent, which is different from the first washing or cleaning agent, into a mold by means of the injector;
e) solidifying at least one of the free-flowing first and second washing or cleaning agents in the mold, thus forming a multiphase washing or cleaning agent shaped body;
f) removing the multiphase washing or cleaning agent shaped body from the mold, wherein the first and second free-flowing washing or cleaning agent are introduced into the mold through outlet openings in the injector which are separated from one another.

In an alternative embodiment, the free-flowing first washing or cleaning agent and the second free-flowing washing or cleaning agent, which is different from the first free-flowing washing or cleaning agent, are provided by differentiating an original free-flowing washing or cleaning agent (master batch). This original free-flowing washing or cleaning agent may be identical to the first or the second free-flowing washing or cleaning agent. Alternatively, the original free-flowing washing or cleaning agent can also be different from the first and the second free-flowing washing or cleaning agent.

The original free-flowing washing or cleaning agent is differentiated, for example, by

- being discharged into corresponding storage containers, in which the original free-flowing washing or cleaning agent is modified by adding further active or auxiliary substances,
- being discharged into a tube system in which the original free-flowing washing or cleaning agent is modified by adding further active or auxiliary substances.

In a particularly preferred embodiment, free-flowing washing or cleaning agents are provided in steps a) and b) and at least one further component is mixed with at least one of the free-flowing washing or cleaning agents in the subsequent method step c). The group of further components particularly preferably supplied in method step c) include, in particular, dyes, fragrances, pH adjusters and solvents. The further component can be mixed with the free-flowing washing or cleaning agents by being introduced by means of an inlet tube, for example.

In step d) of the method, the first free-flowing washing or cleaning agent and the second free-flowing washing or cleaning agent, which is different from the first washing or cleaning agent, are introduced into a mold by means of the injector. The mold can be a permanent casting mold or a "lost" mold (Mogul technique). Permanent casting molds are preferred. These casting molds are preferably made of metal or polymer materials. The use of polymer materials for the casting mold or any coating on the casting mold is preferred.

The casting mold can be open at one side or closed, casting molds which are open at one side being preferred. If casting molds which are open at one side are used, the resulting shaped bodies have a flat upper face corresponding to the open upper face if the viscosity of the casting compound is sufficiently low.

The geometry of the casting mold (and thus of the shaped body produced using the method) is variable over wide ranges. The geometry not only influences the later product aesthetics but also the processability of the shaped body and its later dissolution behavior. The term "processability" covers, for example, the solidification behavior of the shaped body, its removability from the casting mold and its transportability and storability.

The volume of the casting mold is preferably between 1 and 40 ml, more preferably between 2 and 30 ml and in particular between 5 and 25 ml.

In addition to the spatial design of the casting mold, the number and relative arrangement of the outlet openings of the injector is an essential influencing factor for the later aesthetics. In a first preferred embodiment, the injector has an inner tube and an outer tube concentrically surrounding said inner tube.

Alternative and preferred embodiments of the method provide that

- the injector has at least two inner tubes and an outer tube concentrically surrounding said inner tubes;
- the injector has an inner tube and at least two outer tubes concentrically surrounding said inner tube.

In addition to the arrangement and number of outlet openings in the injector, the product aesthetics are also determined by the relative times at which the free-flowing washing or cleaning agents are introduced into the casting mold. For example, the free-flowing washing or cleaning agents can be introduced simultaneously, with a time offset or one after the other.

A first preferred variant of method step d) is characterized in that

- the injector has an inner tube and an outer tube concentrically surrounding said inner tube and
- the first free-flowing washing or cleaning agent is introduced into the mold through the inner tube of the injector and
- the second free-flowing washing or cleaning agent is introduced into the mold through the outer tube of the injector and
- the first and the second free-flowing washing or cleaning agent are introduced simultaneously.

The first and the second free-flowing washing or cleaning agent are introduced simultaneously, provided that the time interval between the start time of the introduction of the first free-flowing washing or cleaning agent and the start time of the introduction of the second free-flowing washing or cleaning agent with respect to a total introduction time $t^1$ of free-flowing washing or cleaning agents in step d) is less than $0.1\ t^1$, preferably less than $0.05\ t^1$.

For example, the time interval can be between 0.01 and $0.05\ t^1$. The total introduction time $t^1$ is the time interval between the start of the first introduction in step d) and the end of the last introduction in step d).

As a result, this procedure allows shaped bodies to be produced having a core, for example a cylindrical core, and a second phase concentrically surrounding said core on the lateral surface thereof, but not on its upper and lower face.

A second preferred variant of method step d) provides that the injector has an inner tube and an outer tube concentrically surrounding said inner tube and the first free-flowing washing or cleaning agent is introduced into the mold through the inner tube of the injector and the second free-flowing washing or cleaning agent is introduced into the mold through the outer tube of the injector and the introduction of the second free-flowing washing or cleaning agent begins before the introduction of the first free-flowing washing or cleaning agent and ends at the same time as the introduction of the first free-flowing washing or cleaning agent.

The introduction of the second free-flowing washing or cleaning agent takes place before the introduction of the first free-flowing washing or cleaning agent, provided that the time interval between the start time of the introduction of the second free-flowing washing or cleaning agent and the start time of the introduction of the first free-flowing washing or cleaning agent with respect to a total introduction time $t^1$ of free-flowing washing or cleaning agents in step d) is more than 0.1 $t^1$, preferably more than 0.2 $t^1$. For example, the time interval can be between 0.1 and 0.9 $t^1$. The total introduction time $t^1$ is the time interval between the start of the first introduction in step d) and the end of the last introduction in step d).

As a result, this procedure allows cavity-shaped bodies to be produced having a filled cavity, the cavity-shaped body being formed from the second washing or cleaning agent, while the cavity is filled with the first washing or cleaning agent.

A third preferred method variant comprises a sequence of method steps in which the injector has an inner tube and an outer tube concentrically surrounding said inner tube and the first free-flowing washing or cleaning agent is introduced into the mold through the inner tube of the injector and the second free-flowing washing or cleaning agent is introduced into the mold through the outer tube of the injector and the introduction of the second free-flowing washing or cleaning agent begins before the introduction of the first free-flowing washing or cleaning agent and ends after the introduction of the first free-flowing washing or cleaning agent.

The introduction of the second free-flowing washing or cleaning agent takes place before the introduction of the first free-flowing washing or cleaning agent, provided that the time interval between the start time of the introduction of the second free-flowing washing or cleaning agent and the start time of the introduction of the first free-flowing washing or cleaning agent with respect to a total introduction time $t^1$ of free-flowing washing or cleaning agents in step d) is more than 0.1 $t^1$, preferably more than 0.2 $t^1$. For example, the time interval can be between 0.1 and 0.9 $t^1$.

The introduction of the second free-flowing washing or cleaning agent ends after the introduction of the first free-flowing washing or cleaning agent, provided that the time interval between the end time of the introduction of the second free-flowing washing or cleaning agent and the end time of the introduction of the first free-flowing washing or cleaning agent with respect to a total introduction time $t^1$ of free-flowing washing or cleaning agents in step d) is more than 0.05 $t^1$, preferably more than 0.1 $t^1$. For example, the time interval can be between 0.05 and 0.3 $t^1$.

The total introduction time $t^1$ is the time interval between the start of the first introduction in step d) and the end of the last introduction in step d).

As a result, this procedure allows shaped bodies to be produced having a core consisting of the first washing or cleaning agent and a shell consisting of the second washing or cleaning agent that completely surrounds said core.

Another method variant is characterized by the fact that the injector has an inner tube and an outer tube concentrically surrounding said inner tube and the first free-flowing washing or cleaning agent is introduced into the mold through the inner tube of the injector and the second free-flowing washing or cleaning agent is introduced into the mold through the outer tube of the injector and i) the introduction of the first free-flowing washing or cleaning agent begins and ends before the introduction of the second free-flowing washing or cleaning agent or ii) the introduction of the second free-flowing washing or cleaning agent begins and ends before the introduction of the first free-flowing washing or cleaning agent.

As a result, this procedure allows multilayer shaped bodies to be produced. The two-fold introduction of different free-flowing washing or cleaning agents according to this method variant allows a two-layer shaped body to be produced. If one of the free-flowing washing or cleaning agents is introduced into the mold before and after the second washing or cleaning agent, this leads to the production of a three-phase shaped body having a base and cover phase of identical composition and a middle phase of a different composition ("sandwich"). Shaped bodies having four, five or more layers can be produced using the same principle.

In step e) of the method, at least one of the free-flowing first and second washing or cleaning agents is solidified in the mold, thus forming a multiphase washing or cleaning agent shaped body. All washing or cleaning agents which are in contact with the surface of the mold are preferably solidified in said mold. All washing or cleaning agents which partially or completely form the surface of the later shaped body are particularly preferably solidified.

In relation to the method variants described above involving two free-flowing washing or cleaning agents, this means that both free-flowing washing or cleaning agents are preferably solidified in step e). As a rule, it will be preferable for all of the free-flowing washing or cleaning agents used in the method to be solidified in step e). Exceptions to this rule are, for example, method variants for producing shaped bodies having a completely enclosed core, in which the core can remain in the solidified shell in free-flowing form, or method variants for producing cavity-shaped bodies having a filled cavity, in which the filled cavity is sealed in a further method step preceding method step f), it being possible, for example, to use water-soluble films for sealing.

With regard to the introduction from the injector in step d) and the subsequent solidification to form well-defined multiphase shaped bodies in step e), a viscosity (Brookfield digital viscometer HATDV-II shaft 3, 20 rpm) of the free-flowing washing or cleaning agents at the time of introduction into the mold in step d) in the range of from 500 to 15,000 cps, preferably from 800 to 10,000 cps, particularly preferably from 1,000 to 7,000 cps and in particular from 3,000 to 6,000 cps, has been found to be advantageous.

The solidification in step e) of the method can involve a large number of different mechanisms, for example delayed hydration, a chemical reaction or radiation curing. However, due to its variability, solidification by lowering the temperature is preferred.

At the time of introduction into the mold in step d), the free-flowing washing or cleaning agents preferably have a temperature above 25° C., more preferably above 30° C., particularly preferably between 30° C. and 80° C.

The temperature difference between the free-flowing washing or cleaning agents introduced into the mold in step d) is preferably between 0° C. and 50° C., more preferably between 0° C. and 45° C. and in particular between 0° C. and 20° C., at the time of introduction.

For the cooling, solidification and shaping of the shaped bodies, it has been found to be advantageous for the free-flowing washing or cleaning agent introduced into the mold through the inner tube in step d) to have a lower temperature than the free-flowing washing or cleaning agent introduced into the mold through the outer tube.

For the same reasons, it is technically preferable for the free-flowing washing or cleaning agent introduced into the mold through the outer tube in step d) to have a higher specific heat capacity than the free-flowing washing or cleaning agent introduced into the mold through the inner tube.

To accelerate solidification and to simplify shaping, the free-flowing washing or cleaning agents are cooled in step e).

The density of the free-flowing washing or cleaning agents at the time of introduction into the mold in step d) is preferably from 0.8 to 1.6 g/cm$^3$, more preferably from 0.9 to 1.5 g/cm$^3$ and in particular from 1.0 to 1.4 g/cm$^3$.

The difference in density of the used free-flowing washing or cleaning agents at the time of introduction into the mold in step d) is preferably in the range of from 0.05 to 0.4 g/cm$^3$, more preferably from 0.05 to 0.3 g/cm$^3$ and in particular from 0.05 to 0.2 g/cm$^3$.

The densities mentioned and in particular the preferred differences in density mentioned have been found to be advantageous for the phase separation of the free-flowing washing or cleaning agents in the mold and thus the aesthetics and usage properties of the shaped body.

For the phase separation in the mold, it has also been found to be advantageous for the free-flowing washing or cleaning agent introduced into the mold through the outer tube in step d) to have a higher density than the free-flowing washing or cleaning agent introduced into the mold through the inner tube.

For the procedure, in particular the pumpability of the free-flowing washing or cleaning agents, the dosability thereof by means of the injector, the solidification thereof in the mold and the removal thereof from the mold, it has been found to be advantageous for at least one of the free-flowing washing or cleaning agents to comprise an aqueous-organic solvent mixture.

Particularly preferred organic solvents originate from the group of ethanol, n-propanol, i-propanol, butanols, glycol, propanediol, butanediol, methylpropanediol, glycerol, propylene carbonate, diglycol, propyl diglycol, butyl diglycol, hexylene glycol, diethylene glycol ethyl ether, diethylene glycol methyl ether, diethylene glycol-n-butyl ether, diethylene glycol hexyl ether, diethylene glycol-n-butyl ether acetate, ethylene glycol propyl ether, ethylene glycol-n-butyl ether, ethylene glycol hexyl ether, ethylene glycol-n-butyl ether acetate, triethylene glycol, triethylene glycol methyl ether, triethylene glycol ethyl ether, triethylene glycol-n-butyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol-n-propyl ether, dipropylene glycol-n-propyl ether, propylene glycol-n-butyl ether, dipropylene glycol-n-butyl ether, tripropylene glycol-n-butyl ether, propylene glycol phenyl ether, propylene glycol diacetate, dipropylene glycol dimethyl ether, methoxytriglycol, ethoxytriglycol, butoxytriglycol, 1-butoxyethoxy-2-propanol, 3-methyl-3-methoxybutanol, propylene-glycol-t-butyl ether and di-n-octylether, preferably from the group of glycerol and propylene glycol.

The free-flowing washing or cleaning agents can be in the form of solutions or dispersions. Emulsions, foams and suspensions can be used as dispersions. Suspensions which have a solid disperse phase in addition to a liquid carrier preferably have a yield point of 0.1 to 10 Pa. Corresponding yield points have been found to be advantageous not only for the stabilization of solid disperse phases in the free-flowing washing or cleaning agents, but also for the dosability of said agents, irrespective of the presence of a solid disperse phase.

The addition of dispersed solids to the free-flowing washing or cleaning agents increases the variability of the formulation and the number of fields of application for the shaped bodies. In a preferred embodiment of the method, at least one of the free-flowing washing or cleaning agents is therefore in the form of a dispersion.

Suitable solid disperse phases are, for example, abrasives, but also washing- or cleaning-active components such as enzymes or fragrances, said components preferably being encapsulated in order to prevent undesired reactions or premature activation. In a preferred method, at least one of the free-flowing washing or cleaning agents therefore contains particles in the form of encapsulated active substances, preferably in the form of encapsulated enzymes or encapsulated fragrances.

In addition to the preferably aqueous-organic solvent mixture and any dispersed active ingredients, the free-flowing washing or cleaning agents preferably also comprise

- polymer film formers, preferably polymer film formers from the group of polyvinyl alcohols,
- surfactant active ingredients, preferably from the group of nonionic or anionic surfactants,
- polymer washing or cleaning additives, preferably from the group of cationic polymers,
- complexing agents, preferably from the group of monomer phosphonates,
- bitterns, preferably denatonium benzoate or denatonium saccharinate.

In a preferred method variant, the free-flowing washing or cleaning agent introduced through the outer tube of the injector comprises at the moment of introduction in step d)

i) 30 to 95 wt. %, preferably 40 to 90 wt. % and in particular 50 to 85 wt. %, of an aqueous-organic solvent, ii) 5 to 40 wt. %, preferably 10 to 35 wt. % and in particular 15 to 30 wt. %, of a polymer film former.

In contrast, the free-flowing washing or cleaning agent introduced through the inner tube of the injector comprises at the moment of introduction in step d)

i) 5 to 40 wt. %, preferably 10 to 35 wt. % and in particular 15 to 30 wt. %, of an aqueous-organic solvent, ii) 20 to 90 wt. %, preferably 40 to 85 wt. % and in particular 60 to 80 wt. %, of surfactant.

On the basis of the method described above, a large number of shaped bodies of the most varied of geometries can be produced. Examples are spheres or hemispheres, cylinders, cones or truncated cones. In general, geometries which have no undercuts and can also be easily removed from solid molds are in particular preferred.

Due to the associated simplified shaping of the shaped bodies in step e), methods in which the multiphase washing or cleaning agent shaped bodies have a ratio of largest to smallest diameter of from 5:1 to 1:1, preferably from 3:1 to 1:1 and in particular from 5:2 to 1:1, are preferred. In particular, multiphase washing or cleaning agent shaped bodies which have a ratio of largest to smallest diameter of from 5:1 to 1.2:1, preferably from 3:1 to 1.2:1 and in particular from 5:2 to 1.2:1, are preferred. The maximum diameter of multiphase washing or cleaning agent shaped bodies is preferably in the range of from 3 to 12 cm, more preferably from 3.5 to 10 cm and in particular from 4 to 8 cm.

The weight of preferred shaped bodies is in the range of from 1 to 40 g, preferably from 2 to 30 g and in particular from 4 to 25 g.

The shaped bodies produced by means of the method are seamless, i.e. do not have, for example, a sealing seam produced by sealing a packaging film.

To increase consumer acceptance, the multiphase washing or cleaning agent shaped bodies have at least one transparent phase. Said transparent phase is preferably an outer phase of the shaped body, for example the spherical shell or the cavity body.

Phases are referred to as "transparent" if they have a transmission above 50%, preferably above 60% and in particular above 80%, in the wavelength range of from 410 to 800 nm at at least one wavelength, preferably at 600 nm. The transmission is determined by means of VIS spectrometry at a sample temperature of 20° C. and a cuvette length of 10 mm.

This application also relates to the multiphase washing or cleaning agent shaped bodies produced using the method described above.

An example multiphase washing or cleaning agent shaped body produced by means of the method described above or an alternative method comprises a) a first gel phase comprising a1) 30 to 95 wt. %, preferably 40 to 90 wt. % and in particular 50 to 85 wt. %, of an aqueous-organic solvent;

a2) 5 to 40 wt. %, preferably 10 to 35 wt. % and in particular 15 to 30 wt. %, of a polymer film former;

b) a second gel phase comprising b1) 5 to 40 wt. %, preferably 10 to 35 wt. % and in particular 15 to 30 wt. %, of an aqueous-organic solvent;

b2) 20 to 90 wt. %, preferably 40 to 85 wt. % and in particular 60 to 80 wt. %, of surfactant, wherein the first gel phase preferably surrounds the second gel phase at least in portions.

The first gel phase of the example shaped body is preferably transparent.

The example shaped body is preferably not coated with a water-soluble film and therefore does not have a sealing seam.

The weight of the example shaped body is preferably in the range of from 1 to 40 g, preferably from 2 to 30 g and in particular from 5 to 20 g.

The example multiphase washing or cleaning agent shaped body preferably has a ratio of largest to smallest diameter of from 5:1 to 1:1, preferably from 3:1 to 1:1 and in particular from 5:2 to 1:1. In particular, multiphase washing or cleaning agent shaped bodies which have a ratio of largest to smallest diameter of from 5:1 to 1.2:1, preferably from 3:1 to 1.2:1 and in particular from 5:2 to 1.2:1, are preferred. The maximum diameter of preferred, example multiphase washing or cleaning agent shaped bodies is preferably in the range of from 3 to 12 cm, more preferably from 3.5 to 10 cm and in particular from 4 to 8 cm.

Some example shaped bodies which are particularly preferably produced by means of the method described above are set out in the following tables:

A. Cylindrical shaped bodies having a weight between 4 g and 30 g which have a cylindrical core and a shell surrounding said core on its lower face and the lateral surfaces (values in wt. % based on the core or the shell)

| | Shaped body 1 | | Shaped body 2 | |
|---|---|---|---|---|
| | Core 1 | Shell 1 | Core 2 | Shell 2 |
| Organic solvent | 5 to 40 | 30 to 95 | 10 to 35 | 40 to 90 |
| Surfactant | 20 to 90 | optional | 40 to 85 | optional |
| Polymer film former | optional | 10 to 35 | optional | 15 to 30 |
| Bittern | optional | yes | optional | yes |
| Dye | yes | optional | yes | optional |

| | Shaped body 3 | | Shaped body 4 | |
|---|---|---|---|---|
| | Core 3 | Shell 3 | Core 4 | Shell 4 |
| Organic solvent from the group consisting of glycerol, propanediol and propylene glycol | 5 to 40 | 30 to 95 | 10 to 35 | 40 to 90 |
| Anionic and nonionic surfactant | 20 to 90 | optional | 40 to 85 | optional |
| Polyvinyl alcohol | optional | 10 to 35 | optional | 15 to 30 |
| Bittern | optional | yes | optional | yes |
| Dye | yes | optional | yes | optional |

B. Conical shaped bodies having a weight between 4 g and 30 g which have a core and a shell surrounding said core on its lower face and the lateral surfaces

| | Shaped body 1 | | Shaped body 2 | |
|---|---|---|---|---|
| | Core 1 | Shell 1 | Core 2 | Shell 2 |
| Organic solvent | 5 to 40 | 30 to 95 | 10 to 35 | 40 to 90 |
| Surfactant | 20 to 90 | optional | 40 to 85 | optional |
| Polymer film former | optional | 10 to 35 | optional | 15 to 30 |
| Bittern | optional | yes | optional | yes |
| Dye | yes | optional | yes | optional |

| | Shaped body 3 | | Shaped body 4 | |
|---|---|---|---|---|
| | Core 3 | Shell 3 | Core 4 | Shell 4 |
| Organic solvent from the group consisting of glycerol, propanediol and propylene glycol | 5 to 40 | 30 to 95 | 10 to 35 | 40 to 90 |
| Anionic and nonionic surfactant | 20 to 90 | optional | 40 to 85 | optional |
| Polyvinyl alcohol | optional | 10 to 35 | optional | 15 to 30 |
| Bittern | optional | yes | optional | yes |
| Dye | yes | optional | yes | optional |

C. Hemispherical shaped bodies having a weight between 4 g and 30 g which have a core and a shell surrounding said core on its lower face and the lateral surfaces (values in wt. % based on the core or the shell)

| | Shaped body 1 | | Shaped body 2 | |
|---|---|---|---|---|
| | Core 1 | Shell 1 | Core 2 | Shell 2 |
| Organic solvent | 5 to 40 | 30 to 95 | 10 to 35 | 40 to 90 |
| Surfactant | 20 to 90 | optional | 40 to 85 | optional |
| Polymer film former | optional | 10 to 35 | optional | 15 to 30 |
| Bittern | optional | yes | optional | yes |
| Dye | yes | optional | yes | optional |

| | Shaped body 3 | | Shaped body 4 | |
|---|---|---|---|---|
| | Core 3 | Shell 3 | Core 4 | Shell 4 |
| Organic solvent from the group consisting of glycerol, propanediol and propylene glycol | 5 to 40 | 30 to 95 | 10 to 35 | 40 to 90 |
| Anionic and nonionic surfactant | 20 to 90 | optional | 40 to 85 | optional |
| Polyvinyl alcohol | optional | 10 to 35 | optional | 15 to 30 |
| Bittern | optional | yes | optional | yes |
| Dye | yes | optional | yes | optional |

In summary, the application provides, inter alia, the following subjects:

1. A method for producing a multiphase washing or cleaning agent shaped body, comprising the steps of
   a) providing a first free-flowing washing or cleaning agent;
   b) providing a second washing or cleaning agent;
   c) feeding the first and second washing or cleaning agent to an injector;
   d) introducing the first free-flowing washing or cleaning agent and the second free-flowing washing or cleaning agent, which is different from the first washing or cleaning agent, into a mold by means of the injector;
   e) solidifying at least one of the free-flowing first and second washing or cleaning agents in the mold, thus forming a multiphase washing or cleaning agent shaped body;
   f) removing the multiphase washing or cleaning agent shaped body from the mold, wherein the first and second free-flowing washing or cleaning agent are introduced into the mold through outlet openings in the injector which are separated from one another.
2. A method for producing a multiphase washing or cleaning agent shaped body, comprising the steps of
   a) providing a first free-flowing washing or cleaning agent in a storage container;
   b) providing a second free-flowing washing or cleaning agent in a storage container;
   c) feeding the first and second washing or cleaning agent to an injector;
   d) introducing the first free-flowing washing or cleaning agent and the second free-flowing washing or cleaning agent, which is different from the first washing or cleaning agent, into a mold by means of the injector;
   e) solidifying at least one of the free-flowing first and second washing or cleaning agents in the mold, thus forming a multiphase washing or cleaning agent shaped body;
   f) removing the multiphase washing or cleaning agent shaped body from the mold, wherein the first and second free-flowing washing or cleaning agent are introduced into the mold through outlet openings in the injector which are separated from one another.
3. The method according to one of the preceding points, wherein the free-flowing washing or cleaning agents are provided discontinuously in steps a) and b), whereas the first and second washing or cleaning agent are fed to the injector continuously in step c).
4. The method according to one of the preceding points, wherein at least one further component is mixed with at least one of the free-flowing washing or cleaning agents while said agents are being fed to the injector in step c).
5. The method according to one of the preceding points, wherein the injector has an inner tube and an outer tube concentrically surrounding said inner tube.
6. The method according to one of the preceding points, wherein the injector has at least two inner tubes and an outer tube concentrically surrounding said inner tubes.
7. The method according to one of the preceding points, wherein the injector has an inner tube and at least two outer tubes concentrically surrounding said inner tube.
8. The method according to one of the preceding points, wherein the injector has an inner tube and an outer tube concentrically surrounding said inner tube and the first free-flowing washing or cleaning agent is introduced into the mold through the inner tube of the injector and the second free-flowing washing or cleaning agent is introduced into the mold through the outer tube of the injector and the first and the second free-flowing washing or cleaning agent are introduced simultaneously.
9. The method according to one of the preceding points, wherein the injector has an inner tube and an outer tube concentrically surrounding said inner tube and the first free-flowing washing or cleaning agent is introduced into the mold through the inner tube of the injector and the second free-flowing washing or cleaning agent is introduced into the mold through the outer tube of the injector and the introduction of the second free-flowing washing or cleaning agent begins before the introduction of the first free-flowing washing or cleaning agent and ends at the same time as the introduction of the first free-flowing washing or cleaning agent.
10. The method according to one of the preceding points, wherein the injector has an inner tube and an outer tube concentrically surrounding said inner tube and the first free-flowing washing or cleaning agent is introduced into the mold through the inner tube of the injector and the second free-flowing washing or cleaning agent is introduced into the mold through the outer tube of the injector and the introduction of the second free-flowing washing or cleaning agent begins before the introduction of the first free-flowing washing or cleaning agent and ends after the introduction of the first free-flowing washing or cleaning agent.

11. The method according to one of the preceding points, wherein the volume of the mold in step d) is between 1 and 40 ml, preferably between 2 and 30 ml and in particular between 5 and 25 ml.
12. The method according to one of the preceding points, wherein both free-flowing washing or cleaning agents are solidified in step e).
13. The method according to one of the preceding points, wherein at least one of the free-flowing washing or cleaning agents comprises an aqueous-organic solvent mixture.
14. The method according to one of the preceding points, wherein, at the time of introduction into the mold in step d), the free-flowing washing or cleaning agents have a viscosity (Brookfield digital viscometer HATDV-II shaft 3, 20 rpm) of from 500 to 15,000 cps, preferably from 800 to 10,000 cps, particularly preferably from 1,000 to 7,000 cps and in particular from 3,000 to 6,000 cps.
15. The method according to one of the preceding points, wherein, at the time of introduction into the mold in step d), the free-flowing washing or cleaning agents have a temperature above 25° C., preferably above 30° C., particularly preferably between 30° C. and 80° C.
16. The method according to one of the preceding points, wherein, at the time of introduction into the mold in step d), the free-flowing washing or cleaning agents have a temperature difference between 0° C. and 50° C., preferably between 0° C. and 45° C. and in particular between 0° C. and 20° C.
17. The method according to one of the preceding points, wherein the free-flowing washing or cleaning agent introduced into the mold through the inner tube in step d) has a lower temperature than the free-flowing washing or cleaning agent introduced into the mold through the outer tube.
18. The method according to one of the preceding points, wherein the free-flowing washing or cleaning agent introduced into the mold through the outer tube in step d) has a higher specific heat capacity than the free-flowing washing or cleaning agent introduced into the mold through the inner tube.
19. The method according to one of the preceding points, wherein the free-flowing washing or cleaning agents are cooled in step e).
20. The method according to one of the preceding points, wherein, at the time of introduction into the mold in step d), the free-flowing washing or cleaning agents have a density of from 0.8 to 1.6 g/$cm^3$, preferably from 0.9 to 1.5 g/$cm^3$ and in particular from 1.0 to 1.4 g/$cm^3$.
21. The method according to one of the preceding points, wherein, at the time of introduction into the mold in step d), the free-flowing washing or cleaning agents have a density difference of from 0.05 to 0.4 g/$cm^3$, preferably from 0.05 to 0.3 g/$cm^3$ and in particular from 0.05 to 0.2 g/$cm^3$.
22. The method according to one of the preceding points, wherein the free-flowing washing or cleaning agent introduced into the mold through the outer tube in step d) has a higher density than the free-flowing washing or cleaning agent introduced into the mold through the inner tube.
23. The method according to one of the preceding points, wherein at least one of the free-flowing washing or cleaning agents has a yield point of from 0.1 to 10 Pa.
24. The method according to one of the preceding points, wherein at least one of the free-flowing washing or cleaning agents is in the form of a dispersion.
25. The method according to one of the preceding points, wherein at least one of the free-flowing washing or cleaning agents contains particles in the form of encapsulated active substances, preferably in the form of encapsulated enzymes or encapsulated fragrances.
26. The method according to one of the preceding points, wherein the multiphase washing or cleaning agent body has a ratio of largest to smallest diameter of from 5:1 to 1:1, preferably from 3:1 to 1:1 and in particular from 5:2 to 1:1.
27. The method according to one of the preceding points, wherein the multiphase washing or cleaning agent shaped body has a ratio of largest to smallest diameter of from 5:1 to 1.2:1, preferably from 3:1 to 1.2:1 and in particular from 5:2 to 1.2:1.
28. The method according to one of the preceding points, wherein the multiphase washing or cleaning agent shaped body has a maximum diameter of from 3 to 12 cm, preferably from 3.5 to 10 cm and in particular from 4 to 8 cm.
29. The method according to one of the preceding points, wherein the multiphase washing or cleaning agent shaped body has a weight of from 1 to 40 g, preferably from 2 to 30 g and in particular from 4 to 25 g.
30. The method according to one of the preceding points, wherein the multiphase washing or cleaning agent shaped body comprises at least one transparent phase.
31. A washing or cleaning agent shaped body produced using a method according to one of the preceding points.

What is claimed is:

1. A method for producing a multiphase washing or cleaning agent shaped body, comprising the steps of:

a) providing a first free-flowing washing or cleaning agent comprising at least 5-40 wt. % organic solvent and 20-90 wt. % surfactant;

b) providing a second free-flowing washing or cleaning agent, which is different from the first washing or cleaning agent, and comprises at least 30-95 wt. % organic solvent and a polymer film former;

c) feeding the first and second free-flowing washing or cleaning agents into an injector having one or more inner tubes and one or more outer tubes concentrically surrounding the one or more inner tubes;

d) introducing the first free-flowing washing or cleaning agent into a mold through the one or more inner tubes and introducing the second free-flowing washing or cleaning agent into the mold through the one or more outer tubes;

e) solidifying at least one of the first and second free-flowing washing or cleaning agents in the mold, thus forming a multiphase washing or cleaning agent shaped body; and f) removing the multiphase washing or cleaning agent shaped body from the mold.

2. The method according to claim 1, wherein at least one further component is mixed with at least one of the first and second free-flowing washing or cleaning agents while said agents are feeding to the injector in step c).

3. The method according to claim 1, wherein, at the time of introduction into the mold in step d), the first and second free-flowing washing or cleaning agents have a temperature above 25° C.

4. The method according to claim 3, wherein the first and second free-flowing washing or cleaning agents have a temperature above 30° C.

5. The method according to claim 3, wherein the first and second free-flowing washing or cleaning agents have a temperature between 30° C. and 80° C.

6. The method according to claim 1, wherein, at the time of introduction into the mold in step d), the first and second free-flowing washing or cleaning agents have a temperature difference between the first and second free-flowing washing or cleaning agents of between 0° C. and 50° C.

7. The method according to claim 6, wherein the temperature difference between the first and second free-flowing washing or cleaning agents is between 0° C. and 45° C.

8. The method according to claim 6, wherein the temperature difference between the first and second free-flowing washing or cleaning agents of between 0° C. and 20° C.

9. The method according to claim 1, wherein the first free-flowing washing or cleaning agent introduced into the mold through the inner tube in step d) has a lower temperature than the second free-flowing washing or cleaning agent introduced into the mold through the outer tube.

10. The method according to claim 1, wherein the second free-flowing washing or cleaning agent introduced into the mold through the outer tube in step d) has a higher specific heat capacity than the first free-flowing washing or cleaning agent introduced into the mold through the inner tube.

11. The method according to claim 1, wherein the first and second free-flowing washing or cleaning agents are cooled in step e).

12. The method according to claim 1, wherein, at the time of introduction into the mold in step d), the first and second free-flowing washing or cleaning agents each have a density from 0.8 to 1.6 g/cm$^3$.

13. The method according to claim 12, wherein the first and second free-flowing washing or cleaning agents have a density from 0.9 to 1.5 g/cm$^3$.

14. The method according to claim 12, wherein the first and second free-flowing washing or cleaning agents have a density from 1.0 to 1.4 g/cm$^3$.

15. The method according to claim 1, wherein the first free-flowing washing or cleaning agent comprises at least 10-35 wt. % organic solvent and at least 40-85 wt. % surfactant, and the second free-flowing washing or cleaning agent comprises at least 40-90 wt. % organic solvent and at least 15-30 wt. % polymer film former.

16. The method according to claim 1, wherein the organic solvent is selected from the group of glycerol, propanediol, and propylene glycol.

17. The method according to claim 1, wherein the surfactant is selected from an anionic and nonionic surfactant.

18. The method according to claim 1, wherein the second free-flowing washing or cleaning agent forms a shell around the first free-flowing washing or cleaning agent to form the multiphase washing or cleaning agent shaped body.

* * * * *